UNITED STATES PATENT OFFICE.

ALBRECHT HEIL, OF FRANKFORT-ON-THE-MAIN, GERMANY.

PRIMARY ELECTRIC CELL OR BATTERY.

941,416. Specification of Letters Patent. Patented Nov. 30, 1909.

No Drawing. Application filed April 6, 1909. Serial No. 488,275.

*To all whom it may concern:*

Be it known that I, ALBRECHT HEIL, a subject of the German Emperor, and resident of Frankfort-on-the-Main, Germany, have invented certain new and useful Improvements in Primary Electric Cells or Batteries, of which the following is a specification.

It is a known fact that cells, or batteries, for small hand lamps, driving fans, and other like purposes, where the cells, or batteries, have to be of small compass, rapidly decrease in activity, as the active substances contained in such cells or batteries can only be present in small quantities, the depolarizer soon failing to act and the cell or battery becoming inoperative.

The object of this invention is to provide a cell or battery, for such purposes which while containing but a small quantity of active substances, remains active for a long time and is uniform in its action.

It is known that sulfate of mercury possesses valuable properties as a depolarizer (see for instance *Haucks Die Galvanischen Batterien*, 1898, page 199, paragraph 3) but in practice the sulfuric acid which passes into the electrolyte dissolves the zinc and forms hydrogen and causes the sulfate of mercury itself to become dissolved without having a depolarizing effect.

The decomposition of the sulfate of mercury occurs in a neutral solution in such a manner that the salt is first decomposed into an easily soluble acid salt, and then into a difficultly soluble basic salt. Immediately an electrode of sulfate of mercury and carbon, or graphite, is introduced into the electrolyte, the sulfate of mercury is decomposed, part of it passing directly into the solution and being consumed uselessly at the zinc, and the remaining basic salt is decomposed when the cell, or battery, produces current, so that on the one hand, sulfate containing an excess of mercury, or even metallic mercury, are formed, while on the other hand, sulfuric acid and water are separated in the mass of carbon, or graphite, so that the basic salt becomes acid and dissolves in the electrolyte, when the cell, or battery, is not at work, the acid solution attacking the zinc without generating useful current. For this reason the basic sulfate of mercury has proved unsuitable as a depolarizer for a durable and economical cell or battery.

In order to obviate the aforesaid disadvantage according to this invention there is added to the sulfate of mercury (which is, as usual, mixed with finely divided carbon or graphite) free mercuric oxid which combines with the liberated sulfuric acid and at the same time forms fresh sulfate of mercury as depolarizer, which possesses over that first introduced a greater activity, as it acts in the nascent state. There is thus obtained, a cell, or battery, producing a current of remarkably constant intensity, with only a small amount of active substances.

Proportions which have been found suitable, but to which I do not limit myself, are two parts by weight of sulfate of mercury, and one part by weight of mercuric oxid well mixed with one part by weight of graphite.

In selecting the electrolyte the chemical properties of the mercurous sulfate must be taken into consideration and an electrolyte containing chlorin should not be used, for the chlorin acting upon the sulfate would produce a salt of chlorin which would be detrimental to the operation of the battery.

A suitable electrolyte is a solution of magnesium sulfate which while the cell, or battery, is not at work, is inactive toward the depolarizer. The small conductivity of such a solution of magnesium sulfate, which would impair the supply of current, can be obviated by adding potassium sulfate to the solution. Potassium sulfate alone is not suitable on account of the formation of a double salt on the zinc, but a mixture of both sulfates, in which the magnesium sulfate predominates (say one hundred parts by weight of water, thirty parts by weight of magnesium sulfate, and eight parts by weight of potassium sulfate) gives good results when used with the aforesaid depolarizer.

In an element of the hereinbefore described kind the current and electromotive force will be considerably increased if manganese peroxid be added to the depolarizing mass consisting of graphite, sulfate of mercury and mercuric oxid. By using a suitable mixture it is possible to obtain a considerable reduction of resistance in the cell, or battery, and an increase of the current intensity up to about sixty per cent. Such a cell or battery will maintain a higher voltage with a uniform load, or the same potential with an increased load. Another advantage is that a considerable portion of the comparatively expensive sulfate of mercury and mercuric oxid can be replaced by the cheap dioxid of manganese, the cell or battery having in this case longer activity. The addition of the dioxid of manganese can be varied within wide limits, but a good proportion for lighting on a small scale consists of three parts by weight of dioxid of manganese, two parts by weight of mercurous sulfate of mercury, one part by weight of mercuric oxid and one part by weight of graphite, but the cell or battery will be efficient if half of the combined weight of sulfate of mercury and mercuric oxid be replaced by dioxid of manganese without increasing the amount of graphite. In this case an economy of fifty per cent. in mercury compounds is obtained, while the total output of the cell or battery, is somewhat higher. The extra cost of the dioxid of manganese is so small as to be practically negligible.

Having now fully described my said invention, what I claim and desire to secure by Letters Patent, is:—

1. A primary cell of the kind described containing in combination with the electrodes and the electrolyte of a depolarizer consisting of sulfate of mercury, finely divided carbon and free mercuric oxid, substantially as and for the purpose set forth.

2. A primary cell of the kind described comprising in combination with the electrodes and electrolyte a depolarizer containing sulfate of mercury, finely divided carbon and free mercuric oxid, substantially as and for the purpose set forth.

3. A primary cell of the kind described comprising in combination with the electrodes an electrolyte formed of sulfate of magnesium and sulfate of potassium and a depolarizer consisting of sulfate of mercury, finely divided carbon and free mercuric oxid, substantially as and for the purpose set forth.

4. A primary cell of the kind described comprising in combination with the electrodes an electrolyte formed of sulfate of magnesium and sulfate of potassium and a depolarizer containing sulfate of mercury, finely divided carbon and free mercuric oxid substantially as and for the purpose set forth.

5. A primary cell of the kind described comprising in combination with the electrodes and the electrolyte of a depolarizer consisting of sulfate of mercury, finely divided carbon, free mercuric oxid and peroxid of manganese, substantially as and for the purpose set forth.

6. A primary cell of the kind described comprising in combination with the electrodes and electrolyte a depolarizer containing sulfate of mercury, finely divided carbon, free mercuric oxid and peroxid of manganese, substantially as and for the purpose set forth.

7. A primary cell of the kind described comprising in combination with the electrodes an electrolyte formed of sulfate of magnesium and sulfate of potassium and a depolarizer consisting of sulfate of mercury, finely divided carbon, free mercuric oxid and peroxid of manganese, substantially as and for the purpose set forth.

8. A primary cell of the kind described comprising in combination with the electrodes an electrolyte formed of sulfate of magnesium and sulfate of potassium and a depolarizer containing sulfate of mercury, finely divided carbon, free mercuric oxid and peroxid of manganese, substantially as and for the purpose set forth.

In testimony whereof I have hereunto set my hand in presence of two witnesses.

ALBRECHT HEIL.

Witnesses:
JEAN GRUND,
CARL GRUND.